(12) United States Patent
Baker

(10) Patent No.: US 7,257,553 B1
(45) Date of Patent: Aug. 14, 2007

(54) METHOD AND SYSTEM FOR AGGREGATION AND EXCHANGE OF ELECTRONIC TAX INFORMATION

(76) Inventor: Samuel R. Baker, 1020 Milwaukee Ave., Deerfield, IL (US) 60015

( * ) Notice: Subject to any disclaimer, the term of this patent is extended or adjusted under 35 U.S.C. 154(b) by 0 days.

(21) Appl. No.: 10/238,948

(22) Filed: Sep. 10, 2002

Related U.S. Application Data

(63) Continuation-in-part of application No. 09/376,283, filed on Aug. 18, 1999, now Pat. No. 6,473,741.

(60) Provisional application No. 60/106,581, filed on Nov. 2, 1998, provisional application No. 60/105,744, filed on Oct. 26, 1998.

(51) Int. Cl.
*G06Q 30/00* (2006.01)
(52) U.S. Cl. ...................................... 705/31
(58) Field of Classification Search .................. 705/31, 705/1, 32, 35; 707/100, 104, 102
See application file for complete search history.

(56) References Cited

U.S. PATENT DOCUMENTS

| | | |
|---|---|---|
| 5,239,462 A | 8/1993 | Jones |
| 5,274,547 A | 12/1993 | Zoffel |
| 5,606,496 A | 2/1997 | D'Agostino |
| 5,611,052 A | 3/1997 | Dykstra |
| 5,615,268 A | 3/1997 | Bisbee |
| 5,699,527 A | 12/1997 | Davidson |
| 5,706,442 A | 1/1998 | Anderson et al. |
| 5,724,523 A | 3/1998 | Longfield |
| 5,966,695 A | 10/1999 | Melchione |
| 6,026,397 A | 2/2000 | Sheppard |
| 6,092,090 A | 7/2000 | Payne |

(Continued)

FOREIGN PATENT DOCUMENTS

JP            410301942 A    11/1998

(Continued)

OTHER PUBLICATIONS

Tom Petska and Fritz Scheuren, The Statistics Corner: information from Tax Returns: The Statistics of Income Program of the Internal Revenue Service: Part 2, Business Economics, vol. 27, No. 3, Jul. 1992, p. 66.*

(Continued)

*Primary Examiner*—Ronald Laneau
(74) *Attorney, Agent, or Firm*—Law Offices of Marc D. Machtinger, Ltd.

(57) ABSTRACT

A process that arranges information warehoused at individual accounting and tax preparation firms at a central location for the purpose of marketing information. Data contained at these firms have qualitative and quantitative characteristics that are different from data archived at the Internal Revenue Service or other tax authorities. This fact makes the data valuable as data in two ways. First the data can be exchanged to provide new revenue streams. Secondly, these data, if grouped into data warehouses of other firms, has value as pure data, not just customer lists. These data may be sold or rented creating additional revenue streams for their originators. The purchasers of this bulk data are interested in using this data in the field of data mining. Data mining is a technique of analyzing vast amounts of information to uncover relationships to predict events and has wide application in many areas of the economy.

37 Claims, 4 Drawing Sheets

U.S. PATENT DOCUMENTS

| | | | |
|---|---|---|---|
| 6,202,052 B1 | 3/2001 | Miller | |
| 6,285,983 B1* | 9/2001 | Jenkins | 705/10 |
| 6,360,208 B1* | 3/2002 | Ohanian et al. | 705/31 |
| 6,446,048 B1 | 9/2002 | Wells | |
| 2001/0002485 A1 | 5/2001 | Bisbee | |
| 2001/0037268 A1 | 11/2001 | Miller | |
| 2002/0111888 A1* | 8/2002 | Stanley et al. | 705/31 |
| 2003/0233296 A1* | 12/2003 | Wagner | 705/31 |

FOREIGN PATENT DOCUMENTS

| | | |
|---|---|---|
| WO | WO 01/82202 A2 | 11/2001 |
| WO | WO 02/27427 | 4/2002 |
| WO | W/O 03/044664 | 5/2003 |

OTHER PUBLICATIONS

Robert P. Parker and Brian C. Grove, The Statistics Producers; Corner: International Statistical Studies, Business Economics, vol. 32, No. 2, Apr. 1997, pp. 68-69.*

Quicken Financial Solution TurboTax (User's Guide for TurboTax and TurboTax Deluxe, 1997).*

Thomas Hoffman, Tax Man Finds Better Way to Reach Data Trove, Apr. 1994.

TALX.COM.

License Agreement and Privacy Policy for Tax-Cut Premium 2004 version Jan. 1, 2004.

Various search results from European Patent office.

Various search results from WIPO.

Scrape It, Scrub It and Show It: The Battle Over Data Aggregation by Thomas P. Vartanian & Robert H. Ledig.

EMC Launches World's Largest-Capacity Disk Storage System, Able To Hold 100 Million U.S. Income Tax Forms, Apr. 6, 1998.

Forms scanning: making it a viable front and for deep data-bases by Harvey Spencer. Advanced Imaging, v12, n11,p. 32(2) Nov. 1997.

Sharing secrets (mortgage banking), by Michael R. Pfeifer, Mortgage Banking, v56, n3, p. 67(8), Dec. 1995.

Alexander M. Walker, Generic Data, 1995 http:www.hsph.harvard.edu/organizations/DDIL/gendata.html, Aug. 23, 1995.

H&R Block Privacy Policy, Jun. 20, 2003, http://www.hrblock.com/taxes/partners/microsoft/privacy_policy.html.

Privacy Policy of NTS. Jun. 27, 2003, http://www.unclefed.com/legalstuff/.

Career Profile of Willem van Schaik, http://www.schaik.com/self/career.html, Nov. 21, 2002.

Career Profile of Gregg P Snell, Nov. 21, 2002.

Leslie Jaye Goff. Apr, 16, 2001 H&R Block's IT Crew Survives Four Months of Taxing Times, http://www.computerworld.com/industrytopics/financial/story/0.10801.59589.00.html.

H&R Block Financial Advisors Deliver Superior Customer Service Through Timely Access to Information, Nov. 2001.

Business Week, Spring 2002, Q&A with H&R Block's Mark Ernst, Mar. 3, 2002, http://www.businessweek.com/bw50/content/mar2002/a3776041.ht.

H&R Block Posting-Operations Analysis, Nov. 22, 2002.

Leveraging the Internet for Segment-Based Marketing, Apr. 8, 2003, http://www.clickz.com/media/agency_strat/article.php/2176241.

H&R Block Ramps Up DR in $100 Million Campaign, Mar. 15, 2002, http://www.directmag.com/ar/marketing_hr_block_ramps/.

Brochure from Claritas Financial Services Group, Dec. 2003.

H&R Block Switches to Microsoft Windows Server System (formerly .NET Enterprise Servers), Improves Scalability and Performance, Jun. 20, 2003.

R.J. Bierman, Using Data to Create Relationships, Jul. 5, 2003.

H&R Block Position Posting, Sr. Analyst, http://www.kchasjobs.com/0/0/9/9/po/000621.htm, Oct. 22, 2003.

Experian web page, Marketing Information, http://www.experian.com/capabilities/data_marketing.html, Jul. 7, 2003.

IRS Compromises Taxpayer Privacy, Jul. 22, 2003, http://www.insightmag.com/news/447808.html.

Informatica Applications Help Intuit Analyse Customer Metrics, DM Review Magazine, Feb. 12, 2003, http://www.dmreview.com/master.cfm?NavID=194&EdID=5405.

Sybase and Intuit Team to Provide Connectivity for the Financial Services Industry, Jul. 15, 1998, http://www.web.archive.org/web/19991012180751/intuit.com/com/corporate/press_re.

Press release, Intuit and Microsoft Advance Fin, ancial Info Exchange on the Internet, http://www/intuit.com/company/press_releases/1999/08b.html, Dec. 8, 1999.

Intuit secretly collects information from Quickbooks 2000 users, http://www/securiteam.com/securitynews/6G00L2K01W.html, Jun. 3, 2003.

TALX Corporation will Provide Automatic Entry of Tax Data Into TurboTax-New Service Available Via W-2 eXpress, Oct. 11, 2001, httP//www.gobizamerica.com.news/news_details.asp?ID=824.

*Joseph Ruben et al vs. Intuit Inc*, http://pub.bna.com/eclr/001778.htm, Oct. 22, 2003.

Rick Whiting, Mind your Business-Companies rethink provacy policies as public concern grows, http://www.informationweek.com/776/privacy.htm, Mar. 6, 2000.

Strategic Marketing-Segmentation, Intuit Practice Development Articles, Oct. 22, 2003.

Intuit.com Privacy Statement, Aug. 15, 2002, http://web.archive.org/web/20000815053035/http://www.intuit.com/privacy/.

DoubleClick privacy questions. http://groups.yahoo.com/group/rre/message/1245, Mar. 2, 2000.

US-AZ-Tucson-Performance Analyst II, Oct. 22, 2003, Intuit Corp.

US-CA-Mountain View Data Management Program Manager, Oct. 22, 2003.

US-CA-Mountain View-Manager, Online Marketing & Merchandising, Reference code online merch, Oct. 22, 2003, Monster.com.

US-CA-Mountain View-Sr Web Development Manager, Reference code mvwebmgr, Oct. 22, 2003, Monster.com.

US-CA-Mountain View-End to End Leader/Master Black Belt, Reference code 50939, Oct. 22, 2003, Monster.com.

Katherine K Schroeder, Inside Intuit, ISBN i-59139-136-9, pp. 169,225, 229, 242, 250, 251-252, 259-262 Primarily, 2003.

Information Week, Mind your Business-Companies rethink their privacy policies as public concern grows, http://www.informationweek.com/776/privacy.htm, Mar. 6, 2000.

Welcome to SpecView for OFX 1.0.2, http:www.ofx.net/ofx/specview/specview102.html, Feb. 16, 1999.

Privacy Statement for TurboTax.com, Oct. 23, 2003.

Listing of news between TALX and Various Customers, http://www.gobizamerica.com/news/news_details.asp?id=824, Jun. 16, 2002.

TurboTax Connec, http://ideinfo.turbotax.com/partner_info/employer.jsp, Dec. 18, 2002.

Turbotax Connect, http://ideinfo.turbotax.com/partner_info/brokerage.jsp, Nov. 10, 2002.

States Turn Super Tax Sleuths, Wall Street Journal May 8, 2002.

Scrape it, Scrub it and Show it, The Battle over Data Aggregation http://www.ffhsj.com/bancmail/bmarts/aba_art.htm, Jul. 10, 2001.

Data Miner/SAS Programmer-position for Intuit, posted Dec. 20, 2002.

Securiteam discusses data collection techniques from their software using Castanet server, http://www.securiteam.com/securitynews/6G00L2K01W.html, Jun. 3, 2003.

GoSystem Tax RS Draws Rave Reviews in its First Tax Season, Jun. 14, 1999.

Coming Soon: The Truly Paperless Return,http://www.businessweek.com/2000/00_05/b3666146.htm, Jan. 31, 2000.

Kambil & Short, Electronic Integration and Business Network Redesign: A Roles-linkage Perspective,, 1993, 39 pages, Mar. 1993.

Resume of Lawrence W Sinclair, http://www.stanyangroup/resumes/sinclair/resume.html, Oct. 28, 2003.

The 21st Century Taxpayer, American Management Systems, Jul. 12, 2001.

1999 Inuit Inc privacy policy, Web.archives.com/ . . . , Dec. 29, 2003.

H&R Block makes Planning Less Taxing with Hyperion, Jun. 10, 2002, http://www.thinkfast.com/press.html.

Hertzberg & Derbort, Tax season's finale brings a thundershower of cash- and it's H&R Block that cleans up. But Intuit is grabbing the future, Baseline Magazine May 2002.

Microsoft E-Tax Administration Framework, 60 pages, Nov. 2000.

Various search results from European Patent office, Jan. 2, 2004.

* cited by examiner

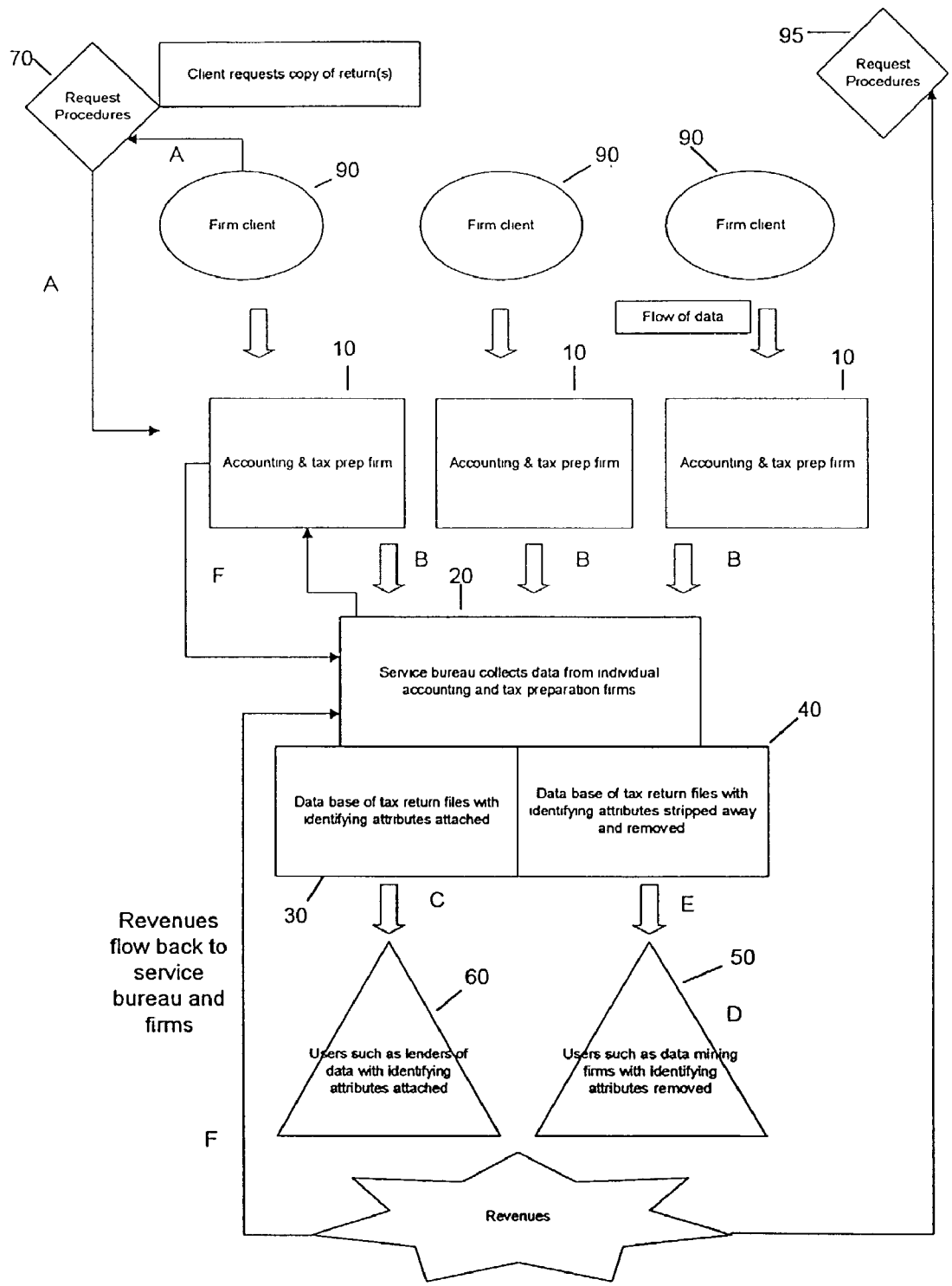

Figure 2

Transmittal from Electronic Return Originator
100     Date_____  Fax to: _____

| | |
|---|---|
| 200 | Firm Name _____ |
| 300 | Firm Number _____ |
| 400 | Taxpayer Name _____ |
| 500 | Social Security Number _____ |
| 600 | Spouse Name _____ |
| 700 | Spouse Social Security Number _____ |
| 800 | Years requested (list up to 3 per form)<br>_____  _____  _____ |
| 900 | Authorized Taxpayer Signature _____ |
| 1000 | Authorized Spouse Signature _____ |
| 1100 | Authorized Firm Signature _____ |
| 1200 | Authorization Number for Firm Signature _____ |
| 1300 | Routing Number of Requestor _____ |
| 1400 | URL of Requestor Organization _____ |
| 1500 | Name of Requestor Organization _____ |
| 1600 | Transaction Number _____ |

80

METHOD AND SYSTEM FOR AGGREGATION AND EXCHANGE OF ELECTRONIC TAX INFORMATION

PRIOR HISTORY

This is a Continuation-in-Part patent application claiming priority from Non-provisional Utility patent application Ser. No. 09/376,283 filed on Aug. 18, 1999 now U.S. Pat. No. 6,473,741, Provisional Application 160/105,744 filed on Oct. 26, 1998 and Provisional Application 60/106,581 filed on Nov. 2, 1998.

BACKGROUND OF THE INVENTION

1. Field of the Invention

This invention and the field of endeavor that it pertains to is a system whereby data bases of accounting and tax preparation data, that is owned by accounting and tax preparation professional services firms, are organized and coordinated in a way that allows $3^{rd}$ parties to electronically access data directly into their computerized applications without the need to re-key data.

2. Description of the Prior Art

CPA firms (and other professional income tax return preparers) maintain paper files of income tax returns as well as computer databases of such income tax returns. Before a lender will make a loan, the lender will request a copy of several years of income tax returns. Presently, loan applicants must furnish these copies to the lender. The manual process of handling paper income tax returns is slow, costly, and places considerable burden on professional tax preparers because they must furnish clients with copies of returns who will in turn give them to their lender.

This invention and the field of endeavor that it pertains to is a system whereby data bases of accounting and tax preparation data, that is owned by accounting and tax preparation professional services firms, are organized and coordinated in a way that allows $3^{rd}$ parties to electronically access data directly into their computerized applications without the need to re-key data. By organizing and coordinating these databases, new and unrecognized benefits will be realized by both the accounting and tax preparation firms and end users such as lenders or data mining firms. There is currently no process or method for electronically exchanging tax return data currently in use that resembles this invention Previously, the Internal Revenue Service began a pilot program around year 1996 that sought to electronically confirm certain key numbers on a tax return after a request was made by a lender participating in the program. The program did not provide a complete transfer of information on the tax return(s) requested but only certain information such as a taxpayers adjusted gross income. Additionally, if the items sought to be confirmed by a lender differed from the amount confirmed by the Internal Revenue Service, the lender was obligated to provide the Internal Revenue Service with a complete copy of the paper tax return submitted by a loan applicant. The loan applicant was then audited and required to account for the discrepancy.

The Internal Revenue Service program was supposed to be expanded but to date is not widely used (and may not be used at all currently). The reason for lack of acceptance of the Internal Revenue Service program is likely that they have very outdated equipment, an inability to respond quickly because of the sheer size of the organization, a perception of distrust on the part of the public at large, and questions of whether they should be involved with a joint effort with private industry in such a manner at all.

The Wall Street Journal has called the IRS computer system a tangle of 80 mainframe computers, 1,335 minicomputers and 130,000 desktop computers that are largely unable to communicate with each other. So although the IRS could conceivably market its own data-base of information for electronic data interchange and/or data mining, it is likely that it would be unable to do so physically. Computer Sciences Corporation has been granted a contract in December, 1998 to upgrade the IRS computers however the IRS' own information officer has stated that it could take another 10-15 years to modernize its computer systems.

Presently, each invention of prior art differs materially from this invention. Specifically, the method for acquiring income tax financial data that is electronically transferred from a data source is different than the method proposed with this invention. The data is not keypunched or reentered into a computer in any way. This method does not involve the scanning of any documents as a method of re-entry also. While the IRS method resembles the patent applied for in some limited respects, it only supplies partial tax return data drawn from IRS data. Additionally, for conventionally filed paper income tax returns, IRS personnel must manually keypunch tax return information into the tangle of IRS computers. This fact would prevent the IRS from rapidly responding to inquiries from $3^{rd}$ parties such as lenders in a manner timely enough to achieve the verification desired by the lending industry. Currently, not all tax returns can be electronically filed because the Internal Revenue Service is not equipped to receive all returns in electronic format. It is well established that the IRS can takes weeks if not months to process much less acknowledge receipt of tax returns. The accounting profession is in a much better if not ideal position to provide these services. This invention relies on the individual databases of tax return information warehoused at individual accounting and tax preparation firms. These differences in the quality, quantity and specific characteristics of data as well as the origin of the source of data have previously not been recognized or used. This represents a very material difference from all prior art. If there is commercial potential for this discrete tax preparation firm owned data, then it has been grossly under-utilized by the profession at large.

There is commercial potential for income tax data to be exchanged electronically with the financial services industry and specifically the lending industry. There is also commercial potential for using such data in the rapidly expanding area of database mining. This field, DataBase Mining, has the ability to utilize and analyze massive quantities of data to obtain surprising and unexpected results. It has the ability to look at vast amounts of data from multiple sources and find patterns and relationships in the data that are otherwise not readily evident. They remain obscured from ordinary analysis. It is possible that income tax data could be stripped of characteristics that associate it and identify it with a particular individual or entity, and such data could be used in the data mining process. The Gartner Group, Inc. expects the data mining industry to grow to be a $16 Billion a year business by year 2002. Such data could represent an alternative to US Census data because US Census data is updated only once every 10 years. Because of the public relations difficulty and physical obstacles of the Internal Revenue Service becoming involved with selling data to private industry, instead private industry could utilize its own resources to achieve commercial results. It is clear that private industry (and particularly the accounting and tax preparation profession) has not made any connection to the potential improvements and benefits to the fields that this unutilized data may have. In other words, it is not obvious.

The American Institute of Certified Public Accountants has created the CPA Vision Project. The project has identified 7 economic platforms that will affect the profession of accounting in the future. Members of the profession as well as the profession itself are threatened with reduced revenues from traditional services, difficulty in adapting to rapid technological changes in the way the profession provides services, and even the type of services that are provided. Lower level and thus traditional accounting services will be displaced by higher level and higher economic value knowledge based services. By providing a method and framework for organizing the databases owned by the profession, it will advance the reputation, prestige, and utility of services by consumers of accounting and tax services. It is interesting to note that the duration of a utility patent is exactly 20 years, which corresponds to the time span of impact for platform #6 of the CPA Vision Project. Thus the profession will have difficulty maintaining its position as the pre-eminent provider of accounting and tax services during a period of rapid technological change unless the profession embraces methods that improve, enhance, and utilize existing and new resources. Traditional CPA tax services may be eroded by the entry of non-traditional providers of these services. This risk is even greater for solo practitioners and small accounting and tax preparation firms as the accounting profession is faced with consolidating forces. This trend toward large firms is arguably anti-competitive and could negatively affect how such services are priced and delivered. Additionally, it may make it more difficult for lower socio-economic persons to obtain personalized assistance that they need. One of the few remaining buffers between the dizzying bureaucracy of the taxing authorities and ordinary citizens are practitioners who provide personalized service and who know how the system operates. Large consolidated accounting and tax firms would likely exacerbate the problem by further adding to depersonalization in an effort to bolster profits. As a case in point, as of this writing, Cisco Systems said it would invest $1 Billion in the accounting firm of KPMG so KPMG could expand its technology consulting business. It is unclear what impact this would have on smaller practitioners or consumers. However, by providing small practitioners with a new revenue stream as well as enabling them to provide a unique service (that of electronic exchange of tax data) they will have a competitive advantage against both large firms and competition from non-traditional providers of accounting and tax preparation services.

A difficulty with actually implementing a direct electronic exchange of income tax data between firms and interested parties such as lenders or data mining firms is that without some agreement or standard for data format and a predetermined arrangement for allocating revenues and expenses associated with such a system, natural competitive forces would make differing systems for implementing electronic exchanges of data confusing. The end result would be that either there would be several large companies dominating the arena or any attempts to implement a workable system would be too fragmented. Therefore it makes sense that there is a gatekeeper organization to coordinate and organize all the databases owned by firms to ensure equal access and uniform standards. The gatekeeper would also provide for controls to protect confidentiality, and serve as a clearinghouse for allocating revenues and expenses back to accounting and tax preparation firms. Finally, the data of each accounting and tax preparation firm has less commercial value individually than it has when grouped together with the data of all accounting and tax preparation firms. In other words, massive amounts of data have greater commercial value but all this data needs to be organized and coordinated by a gatekeeper that would be a cooperative clearing house or service bureau.

Several prior art patents have been issued dealing generally with the gathering of financial information. U.S. Pat. No. 5,239,462 issued to Jones et al discloses a method and apparatus to provide the real-time automatic determination of the approval status of a potential borrower of a loan. The Jones et al patent uses facsimile transmissions to quickly determine the approval of a loan application by way of predefined information entered on a form. However, the Jones et al patent does not teach storing information from the different borrowers in a central location to be used for statistical study purposes. The Jones et al patent does not further teach stripping such information of identifiable characteristics so that third parties may use the information without compromising the identity of the individual borrowers.

U.S. Pat. No. 5,274,547 issued to Zoffel et al discloses a system and methods for generating credit reports. A central data processor requests credit information on an applicant from one or more credit repositories through a dedicated data link. A credit report is then generated and transmits the report to the requesting user. Requests and reports are transmitted via a communication system or network. If data is inputted from more than one repository, the central data processing facility eliminates duplicated data. However, the Zoffel et al patent does not teach stripping such information of identifiable characteristics so that third parties may use the information for statistical study without compromising the identity of the individual applicants.

U.S. Pat. No. 5,606,496 issued to D'Agostino discloses a personal financial assistant computer system and method including customer terminals at financial institution branch offices or other locations. Each customer terminal stores financial information for the particular financial services sold at that terminal. At least one representative terminal is provided at a central location and includes a display and keyboard. A telephone link is also provided between the customer terminals and the representative terminals for voice communication. A representative at the representative terminal controls the customer terminal in response to commands initiated from the input device. However, the D'Agostino patent does not teach storing information from the different customers in a central location to be used for statistical study purposes. The D'Agostino patent does not further teach stripping such information of identifiable characteristics so that third parties may use the information without compromising the identity of the individual customers.

U.S. Pat. No. 5,611,052 issued to Dykstra et al discloses an apparatus and method for automatic credit evaluation and loan processing. The apparatus includes a central processing unit which has capabilities for communicating with off-site remote access terminals. The central processing unit is accessed from a remote terminal, loan application information is entered into the remote terminal, credit bureau information is accessed by the apparatus, credit scoring is performed, and a loan application is approved or declined. All steps, except for the entering of loan application information into the remote terminal, is fully automated. However, the Dykstra et al patent does not teach stripping such information of identifiable characteristics so that third parties may use the information for statistical study without compromising the identity of the individual applicants.

U.S. Pat. No. 5,724,523 issued to Longfield discloses an electronic data processing system for preparation of electronically filed tax returns and authorization and payments of refunds based on the data supplied in those returns. Electronic data processing programs are provided for creating an electronic tax return that is filed with a tax collecting authority. At the same time as the electronic tax return is created a loan application is processed to create an electronic deposit/loan account for the tax filer at an authorized credit institution. However, the Longfield patent does not teach storing information from the different tax payers in a central location to be used for statistical study purposes. The Longfield patent does not further teach stripping such information of identifiable characteristics so that third parties may use the information without compromising the identity of the individual tax payer.

U.S. Pat. No. 5,699,527 issued to Davidson discloses a loan processing system to aid a potential loan applicant preparing the necessary financial statement, loan application, and business plan to apply for a business loan. The lending institution then reviews the transmitted information and responds. However, the Davidson patent does not teach storing information from the different applicants in a central location to be used for statistical study purposes. The Davidson patent does not further teach stripping such information of identifiable characteristics so that third parties may use the information without compromising the identity of the individual applicants.

Other objects, features, and advantages of the invention will become more readily apparent upon reference to the following description when taken in conjunction with the accompanying drawings.

SUMMARY OF THE INVENTION

The invention is a system or apparatus for the electronic exchange of tax data between the financial services industry including the lending industry and/or other interested parties such as data mining firms of such data and the electronic data-bases owned and maintained by individual accounting and tax preparation firms. The exchange should be facilitated by a cooperative service bureau that acts as an intermediary to ensure the smooth flow of information, standardize the data formats, protect confidentiality by providing for controls, and allocating revenues and expenses. The service bureau would also add to the commercial value of the individual firm owned data. The exchanged data would be downloaded directly into applications of end users for analysis thus reducing or eliminating labor and costs due to data entry, filing, etc. A cooperative service bureau could also serve to package income tax data contained in consumer oriented tax software used by individuals to be delivered to other end users such as lenders.

The invention described has many advantages over existing methods and solves problems relating to prior art. By eliminating the use of paper copies of tax returns, costs for accounting and tax preparation firms are reduced by eliminating paper, postage, labor, and time. Users of such tax information save costs for the same reasons. Because information is accessed rapidly, the public is benefited by additional cost savings and faster decisions by lenders and other interested parties. Also, lenders and other interested 3rd parties have some assurance that information received directly from a professional tax preparer has not been altered in a fraudulent manner. The pilot program of the Internal Revenue Service only transmitted certain key numbers whereas this system transmits all tax information as well as certain information never before archived by the Internal Revenue Service. This complete transfer of tax information will enable end users to perform a more complete analysis of a type not currently done. For example, these data would be downloaded into credit scoring software that could make an evaluation of a loan applicant based on many more factors than is currently being used including incorporating data-base mining techniques that would provide much more extensive analysis than that currently in use. Since professional tax preparers data would not be different from data submitted to the Internal Revenue Service by taxpayers, a layer of verification would be eliminated on the part of lenders. It should not be the function of the IRS to seek out fraud in the private sector. A self-policing profession would perform this function by its existing and evolving framework for professional ethics. Therefore, loan applicants would not be subject to cases of entrapment by lenders and the IRS. Individual firm databases are more reliable for retrieving and sending income tax data in a fast and efficient manner than IRS or other agency computers. This is so because the source of data is owned and managed by private industry. This invention provides a new and unique use for data owned by individual firms that creates new revenue streams for the profession and other users such as lenders. It does so in a way that enhances the image of the public accounting profession and the tax preparation profession and provides an answer to real competitive threats. Finally, such a system or apparatus would help keep competition open by providing small and large practitioners with a service that would act to reinforce client relationships by providing efficiency, cost savings, and goodwill in the form of improved service. It is similar to private delivery services competing with the United States Postal Service. Not only does the marketplace have a need for private and public carriers, but also competition keeps the marketplace for such services open and fair. There is a risk that large consolidated firms would eventually dominate this invention as the ease of using technology was met with sheer market size. Using this invention would allow smaller practitioners to continue to assist consumers in a personalized manner while still applying technology in a positive way.

BRIEF DESCRIPTION OF THE DRAWINGS

FIG. 1. A flow diagram of my method for the electronic exchange of tax information.

FIG. 2. A sample request form.

DETAILED DESCRIPTION OF THE INVENTION AND PREFERRED EMBODIMENTS

Figure 3:
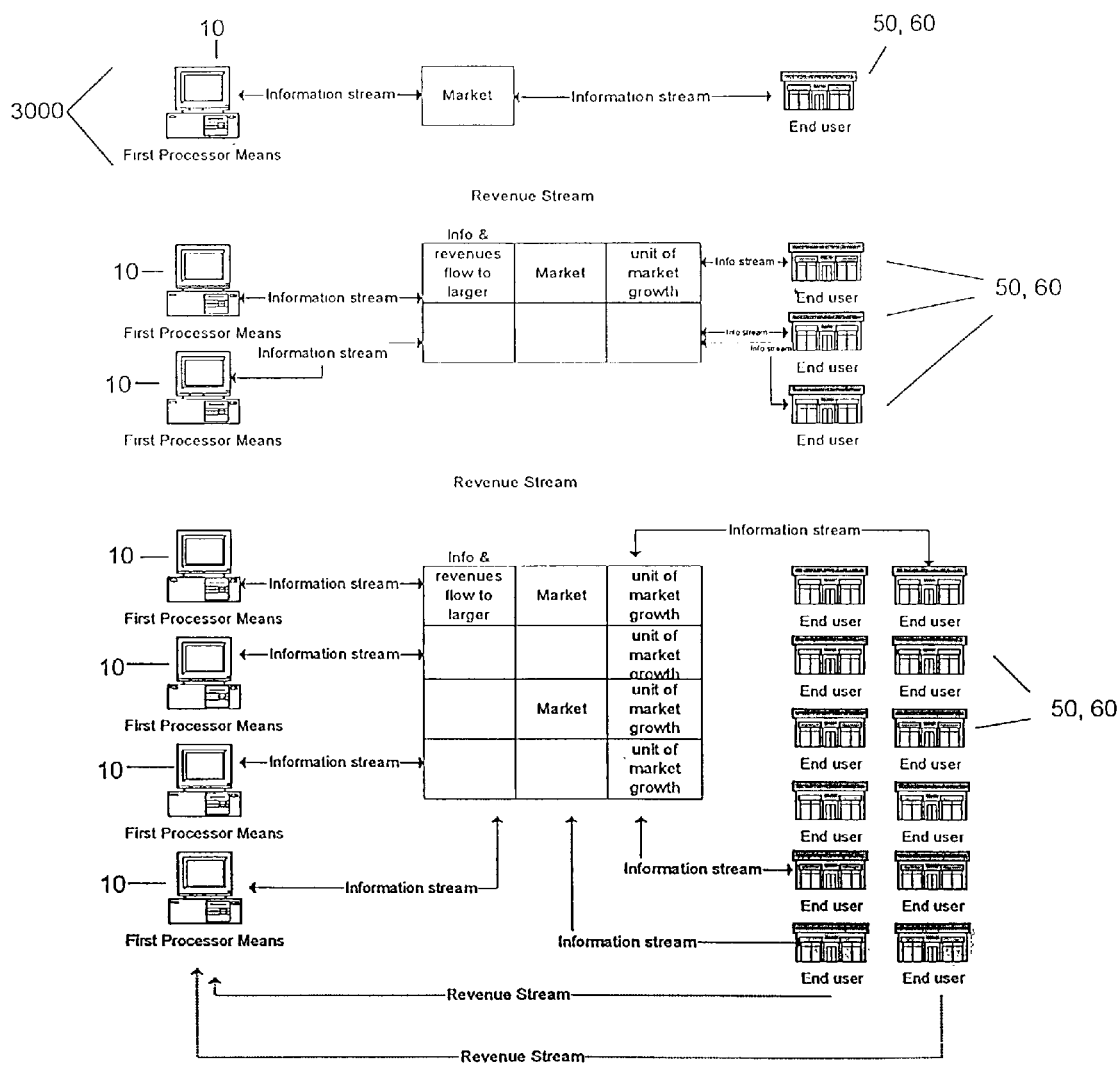
FIG. 3. A diagram of the growth of goodwill and revenue.

FIG. 1 shows data is to be submitted by participating accounting and tax preparation firms 10 in electronic format as simply a backup of the database of their respective tax preparation software. When received by the service bureau or data cooperative 20, the data is catalogued and stored in multiple formats. When received by the service bureau 20 data is stored in the format received. This data can be used for two purposes that provide advantages to accounting and tax preparation firms 10. First, a service bureau 20 can provide no cost or very low cost off site archival of data Backing up firm 10 data is a critical function that is frequently overlooked by smaller accounting and tax preparation firms. Secondly, a service bureau 20 can provide no cost or very low cost transmission of electronically filed income tax returns. Currently, most firms 10 pay a user fee to their software vendor for this service. Then, data is stored in detail with associated identifying characteristics of the taxpayers such as name, social security numbers, and addresses. These data are to be stored on a separate system 30 that protects the confidentiality of each taxpayer and may only be released with proper authorization procedures and controls. These data are also converted to an electronic format suitable for retrieval by users requesting information such as a mortgage lender. The format will enable a mortgage lender to directly download the complete tax return into their analysis software and/or credit scoring software.

Finally, the data are also stored in another massive database that strips away all personal identifying characteristics such as names, social security numbers, addresses and telephone numbers 40. These data will be made available for purchase or rental to organizations and companies that wish to utilize the data for data mining purposes 50. The data may be used either as is or combined with other data base warehouses of information.

In each case the owners of the original accounting and tax preparation firm databases 10 will be paid a usage fee based upon a rational allocation of individual taxpayer files. In the case of a specific tax return requested by a mortgage lender 60 for example, the fee will be paid by the mortgage lender 60. This cost will be built into the cost of the loan application process and will appear to be transparent to a loan applicant. The fee will be allocated to the tax preparation firm 10 and the service bureau 20.

Individual returns are used as part of a massive data base 40 for data base mining where the identifying information has been stripped away for the other essential data. Then, again, a rental fee or usage fee will be charged and divided between the originating tax preparation firm 10 and the service bureau 20.

While data may be dispatched directly from preparing firms 10 in the future, the beginning embodiment is for data to be cleared through a cooperative or service bureau 20. As systems are developed in the future, the data may one day be transmitted directly from originating tax preparation firms 10. It may prove to be convenient for such a service bureau 20 to also serve as a transmitter of electronically filed income tax returns because it would make sense to house the information at a single location.

For specific tax returns that are requested by a lender 60 of other 3$^{rd}$ party end user (that is returns with specific identifying characteristics of Name, tax identification number and address) a request form 70 would be filled out and faxed to the service bureau 20. In the future, an electronic request would be used as procedures and technology for authentication of requests is put into place and function with adequate controls.

FIG. 2 shows a sample request form 80 is enclosed with this patent application with the following item descriptions that are numbered from 100 though 1600.

Item #100. Date of request. (The date a taxpayer requests verification of tax data from the service bureau)

Item #200 Fax number. This is the telephone number of the service bureau fax receiving point. At this point, there would either be some human intervention as a cross check for authentication and validity of request and/or the form could be scanned into a data storage and retrieval system used to generate data for the request.

Item #300. Represents the full Firm Name of the firm that originally prepared the tax return.

Item #400. Represents the full name of the taxpayer listed on the return as filed with tax authorities. This could be an individual taxpayer or another type of entity such as a corporation or partnership.

Item #500. Social Security Number of Tax Identification number of the person or entity named in item #400.

Item #600. Spouse's full name taxpayer listed on the return as filed with tax authorities.

Item #700. Spouse's social security number of the person named in item #600.

Item #800. Calendar years requested or in the case of fiscal year filers, fiscal years requested that relate to the above named individuals or entities.

Item #900 & 1000. Authorized taxpayer and spouse signatures. In the case of an entity other than an individual tax return, the authorized signer for that entity such as president of a corporation. In this case the title of the person signing would be so indicated.

Item #1100. This is the signature of the authorized firm person such as a partner or the person that actually prepared and signed the return. This person is essentially vouching for the identity of the authorized taxpayer signature contained in item #900 & 1000. Additionally, a procedure would be established so that a taxpayer could make a direct request to the service bureau without a tax preparing firm authorization. In this case a notary seal or other signature guarantee would be required before the request for taxpayer data would be processed.

Item #1200. The tax preparation firm would have a firm number as a unique identifying tag. The number would be guarded like a password so that it would be very difficult to masquerade as an authorized tax preparation firm member. Also, the firm signer could also have an identifying number for the same purpose.

Item #1300. Like a bank routing number on a check, the end user would have a routing number that would be used to route the data to that firm's computer system for direct download and analysis.

Item #1400. This represents the "Uniform Resource Locator" in Internet Jargon. This also would be used to route data to an end user. However, there may also be routing of data over private computer network other than the Internet to ensure integrity and privacy of data. Item #1500. This is the name of the end user of data. This would be the name of the lender for example.

Item #1600. The transaction number is a number that would be assigned for tracking purposes and would also act like an invoice number so that the appropriate user fee would be charged to the end user such as a lender.

Once a valid request for data is received by the service bureau 20, the embodiment of the flow of income tax data from the tax preparation firm 10 to the ultimate end user 50,60 is described as follows. See FIG. 1.

Step A. A request for verification is faxed to the service bureau 20 organization that houses data from participating tax preparation firms 10. The request is originated by a specific taxpayer 90 who wants to have his or her taxpayer information verified to a lender, for example. This authorizing document (or electronic facsimile), known as the Transmittal from Electronic Return Originator, is processed so that the requested data is located in the service bureau 20 data warehouse and packaged or arranged in a format for download into the end users computer system. The format may simply be one currently in use or may be created to facilitate particular needs of end users.

Step B. Tax preparation firm 10 submits their databases of income tax data for archival and later retrieval by requesting organizations. Such retrievals will consist of specific requests 70 for taxpayer income tax data with identifying characteristics attached such as name and tax ID#, and request for bulk tax data stripped of specific identifying data to be used for data mining purposes by a variety of organizations. Clients of accounting and tax preparation firms 90 engage and employ these professional service firms 10 to assist them with their tax compliance matters. As a result of automated tax preparation, these accounting and tax firms 10 have warehouses of databases of tax returns in digitized format. These data warehouses are kept traditionally to satisfy Internal Revenue Service rules relating to record keeping and have not been viewed as having a value outside this requirement. Such firm owned databases also represent customer lists that are used for assigning a dollar value as to goodwill or going concern value. These values for goodwill or going concern have no previously recognized value in the marketplace except for purposes of selling an entire or portion of a tax practice and/or for cross selling additional financial products and services. The value of these data lists as lists has been grossly unutilized.

Step C. As a result of owning these data bases of taxpayer data that originate form the performance of professional accounting and tax preparation services 10, these data now have value if they can be organized and coordinated to capitalize on the data as data and not just customer lists. By participating in the massive archival of all firm data at a central service bureau 20, a service bureau 20 can organize all these data and coordinate dissemination of such data for a rental fee or user fee. This fee is very different from fees collected by professional accounting and tax preparation firms 10 for the original purpose of their work. That being assisting the client in complying with myriad tax rules. It is this new use coupled with the fact that the data originate directly from tax preparation firms 10 instead of the Internal Revenue Service or other tax authorities together with the fact that the quantitative and qualitative characteristics of the data are very different from data archived by tax authorities makes this system extremely commercially valuable.

Step D. When $3^{rd}$ party users of data 50, 60 analyze data received by direct electronic exchange, they are benefited in several important ways. First, they save money through efficiency. Secondly, efficiency creates speed in processing their paperwork such as a loan application. Third, such efficiency and speed create goodwill for their customers and provide an important marketing tool in marketing their services or goods. Fourth, not only is money saved though costs savings, it is possible to mark up such process of participating and executing this invention thus creating a new revenue stream. This revenue stream will be shared with other members in the chain of data flow.

Step E. Data that is warehoused at the service bureau 20 is also stored in a separate massive data base stripped of its identifying characteristics 40. This data will be sold in bulk for data mining purposes.

Step F. $3^{rd}$ party users such as lenders 60 remit user fees back to the service bureau 20 a portion of which is allocated back to the accounting and tax preparation firm 10 that originated the data. Accounting and tax preparation firms 10 will realize a new and never before seen source of revenue. They will experience enhanced status and client goodwill. The relationships with their clientele will be fortified as clients realize there is a new and additional reason to continue with the relationships between themselves and their accounting and tax preparation firms. Otherwise, changes in the profession of accounting and tax preparation will erode the status and revenues that these firms 10 have had either through technology in the hand of clients or other competitive pressures in the marketplace.

The embodiments for effecting data exchanges between accounting and tax preparation firms 10, the service bureau 20, and companies performing data mining of taxpayer data 50 are similar to the request procedures above. There will be a request procedure 95 to receive data stripped of identifying characteristics. The request 95 will consist of a form that specifies the exact parameters of data requested such as zip codes, income levels, age of taxpayer, etc. The request would be similar to that used in the list brokering industry except that the use of the information will be for data mining and not marketing directly.

The service bureau 20 that acts as the aggregator and conduit of massive quantities of data on behalf of accounting and tax preparation firms 10 will allocate revenues and expenses back to the accounting and tax preparation firms. The service bureau 20 will add value to data because the data is more valuable to data miners in massive quantities. The data must also be coordinated and arranged in such a way that it is usable by data mining companies 50. For example, because accounting and tax preparation firms 10 maintain their data in numerous professional tax preparation software packages, the data must be standardized in order to be usable to data mining companies 50.

This new process creates a entirely new revenue stream for the accounting and tax preparation profession. It will add to the prestige, status, and goodwill of accounting and tax preparation firms 10 by also creating a new and useful service previously unrecognized by the profession and the consuming public by creating cost savings for everyone. It will provide useful and critical strategic insights into existing problems and provide solutions to problems not yet recognized in many industries and the economy as a whole. These massive amounts of data to be used in data mining provide alternatives to existing methods of compiling information such as United States Census Bureau data because they will be available every year on an up to date basis. These massive amounts of data can be used in a way contrary to old beliefs. By adding these massive amounts of data to other data warehouses, it increases the value of all data mining. These massive amounts of data have the potential to influence how business is done on a very large scale and as such will provide startling and surprising results. Because it is not obvious from any prior art that these result would have been predicted, certain details of the embodiment have not been finalized however, the above description provides a working model. The accounting and tax preparation profession have not recognized in any manner that the data bases owned by individual firms 10 have value beyond that of a record keeping/filing system that is a consequence of performing traditional functions and services.

Figure 4:
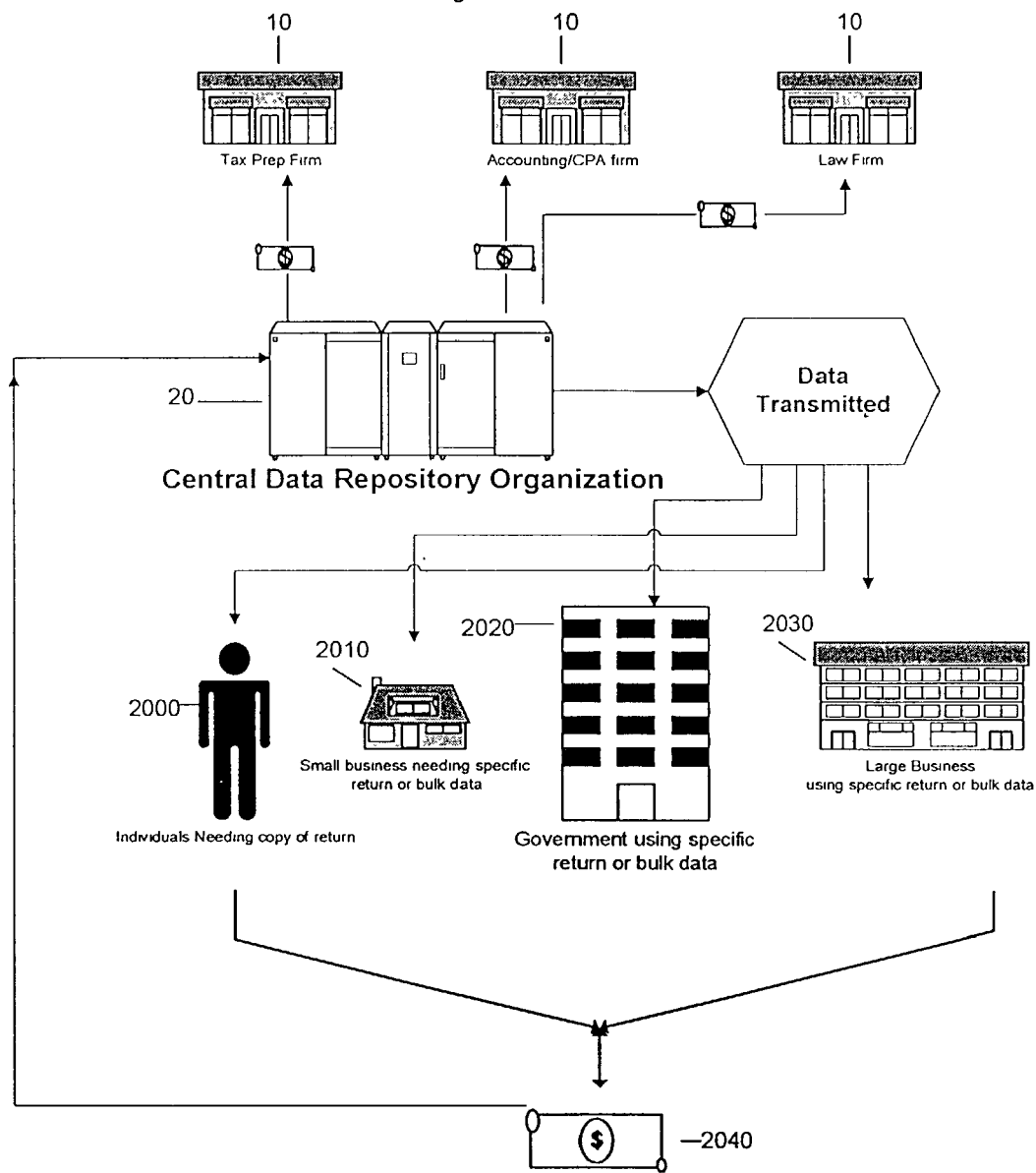
FIG. 4. A diagram of the flow of data and revenue.

Referring to FIG. 4, when individuals 2000, small businesses 2010, government 2020, or large businesses 2030 use information, a usage fee 2040 is paid. This usage fee is collected by the central data repository 20. The central data repository or gatekeeper authority 20 allocates revenues 2040 back to originating firms based on a rational allocation. Revenue 2040 may not necessarily be collected by the central data repository 20 in cash money. Such revenue 2040 will also be collected in the form of additional data or other intangible consideration or a plurality of consideration.

Referring to FIG. 3, every time a business operating cycle 3000 ends and then begins, the market is increased by a unit of growth. Each operating cycle adds information and revenue to a larger market. With each operating cycle, the number of originators, and the number of third party end users increase. Therefore FIG. 3 represents a sustained marketplace that is the expression of anticipated future revenues. This is also known as goodwill. FIGS. 1,2,3, and 4 represent both individually and collectively a market. Markets are typified by orderliness of transactions. In the instance of the electronic exchange of tax information, it is not likely that such orderliness could be achieved using existing methods and systems As commonly understood and defined by Webster's dictionary, a brand is defined as a characteristic or distinctive kind. As it pertains to a method and system for the aggregation and exchange of electronic tax information, the brand of the method and system is all the attributes, both tangible and intangible that users of this invention experience. This experience is a new method of doing business. It is also a characteristically distinctive system providing a means for accomplishing the object of this invention. Until recently, according to an article in Business Week dated Aug. 26, 2002, brands were lumped together into aggregate goodwill. While usually unrecorded on company balance sheets, brands are increasingly being recorded as a separate asset whether or not they were internally generated or purchased.

Therefore, the brand of tax information represented by this invention is a significant asset in describing the total market for tax information. Historically, accountants and CPA's have provided certain limited assurances or perceived assurances regarding information they complied or audited. The structure of the market, as represented by this invention and by its nature, will add assurance and trust to tax information by formalizing such information using a method to aggregate tax information and a system for accessing the information for authorized and legal purposes. Users of tax information from this invention will expect aspects of the invention to be standardized such as file formats. Attributes such as consistency, usability, and quality will be standardized. A user of this invention will experience these attributes from anywhere consistently. This standard, usability, consistency, quality, speed and loyalty of using tax information is the brand of this invention.

The invention described above is the preferred embodiment of the present invention. It is not intended that the novel device be limited thereby. The preferred embodiment may be susceptible to modifications and variations that are within the scope and fair meaning of the accompanying claims and drawings.

The invention claimed is:

1. A method for electronic aggregation of information compiled by entities preparing or handling tax information, the method comprising:

electronically downloading tax information compiled by a plurality of tax return preparation entities wherein fulfilling requests of interested non-tax preparation parties is enabled by said downloading;

storing the information in a non-tax compliance authority database allowing use of the information aggregated from the plurality of submitting entities for non-tax compliance purposes wherein fulfillment of requests not related to tax preparation functions is enabled by said non-tax compliance authority database;

protecting information indicating identities of persons or entities connected with the information during at least a portion of request and fulfillment steps.

2. The method for electronic aggregation of information of claim 1 wherein the electronic downloading of information is performed over the Internet.

3. The method for electronic aggregation of information of claim 2 further comprising the step of storing the electronically downloaded information into a central database before protecting information indicating identities of persons or entities connected with the information.

4. The method for electronic aggregation of information of claim 3 wherein the storage of the electronically downloaded information is provided without charge to the entities sending the downloaded information.

5. A method for electronic aggregation and exchange of information compiled by entities preparing or handling tax information, the method comprising:

electronically downloading tax information compiled by a plurality of tax return preparation entities wherein fulfilling requests of interested non-tax preparation parties is enabled by said downloading;

storing the information in a non-tax compliance authority database allowing use of the information aggregated from the plurality of submitting entities for non-tax compliance purposes wherein fulfillment of requests not related to tax preparation functions is enabled by said non-tax compliance authority database;

protecting information indicating identities of persons or entities connected with the information making the remaining information free of identifiable characteristics;

receiving a request from a requesting party for use of the information;

retrieving data from the information to fill the request; and sending the requested data to the requesting party.

6. The method for electronic aggregation and exchange of information of claim 5 further comprising loading the requested data directly into a system of the requesting party.

7. The method for electronic aggregation and exchange of information of claim 6 wherein the electronic downloading of information is performed over the Internet.

8. The method for electronic aggregation and exchange of information of claim 7 further comprising the step of storing the electronically downloaded information into a central database before protecting information indicating identities of persons or entities connected with the information.

9. The method for electronic aggregation and exchange of information of claim 8 wherein the storage of the electronically downloaded information is provided without charge to the entities sending the downloaded information.

10. The method for electronic aggregation and exchange of information of claim 9 further comprising generating revenue by charging a fee for retrieving and sending the requested data to the requesting party.

11. The method for electronic aggregation and exchange of information of claim 10 wherein storing the electronically downloaded data free of charge and providing compiled data from a plurality of submitting entities generates goodwill toward the entity practicing the method.

12. A system for electronic aggregation of information compiled by entities preparing or handling tax information, the system comprising:

a plurality of independent tax return preparation processing means, the processing means gathering tax information from the preparation and handling of tax information;

a non-tax compliance authority database storing the information wherein fulfillment of requests not related to tax preparation functions is enabled by said non-tax compliance authority database;

a central processing means having a communication link to the plurality of processing means, the central processing means having means for receiving information from the plurality of independent processing means; and means for protecting information indicating identities of persons or entities connected with the information.

13. The system for electronic aggregation of information of claim 12 further comprising a central database storing the information received from the plurality of independent processing means before the means for protecting protects the information indicating identities of persons or entities connected with the information.

14. The system for electronic aggregation of information of claim 13 wherein the communication link is established via the Internet.

15. A system for electronic aggregation and exchange of information compiled by entities preparing or handling tax information, the system comprising:

a plurality of independent tax return preparation processing means gathering tax information from preparing and handling tax information;

a central processing means having a communication link to the plurality of independent processing means, means for protecting information indicating identities of persons or entities connected with the information to the plurality of independent processing means;

a central non-tax compliance authority database storing the information wherein fulfillment of requests not related to tax preparation functions is enabled by said non-tax compliance authority database; and a request processing means having a communication link to the plurality of independent processing means, the request processing means having algorithmic means for processing a request for information and for sending requested information to the plurality of independent processing means.

16. The system for electronic aggregation and exchange of information of claim 15 further comprising automatic electronic processing means for collecting a fee for processing a request for information.

17. The system for electronic aggregation and exchange of information of claim 16 wherein the communication link is established via the Internet.

18. A method for electronic aggregation and exchange of information compiled by entities preparing or handling tax information, the method comprising:

electronically downloading tax information compiled by a plurality of tax return preparation entities from the preparation and handling of tax information;

storing the information in a non-tax compliance authority database without charge to the entities sending the downloaded information generating goodwill toward the entity practicing the method wherein fulfillment of requests not related to tax preparation functions is enabled by said non-tax compliance authority database;

receiving a request from a requesting party for use of the information for non-compliance purposes;

protecting information indicating identities of persons or entities connected with the information making the remaining information free of identifiable characteristics;

retrieving data from the information to fill the request; and sending the requested data to the requesting party.

19. The method of claim 18 further comprising loading the requested data directly into a system of the requesting party.

20. The method of claim 19 further comprising the step of storing the electronically downloaded information into a central database before protecting information indicating identities of persons or entities connected with the information.

21. A system for electronic aggregation of information compiled by entities preparing or handling tax information, the system comprising:

a plurality of independent tax return preparation processing units preparing or handling tax information;

a central non-tax compliance authority processing unit having a communication link to the plurality of independent processing units for receiving information from the plurality of independent processing units wherein fulfillment of requests not related to tax preparation functions is enabled by said non-tax compliance authority database, protecting information indicating identities of persons or entities connected with the information; and a non-tax compliance authority database storing the information.

22. The system of claim 21 further comprising a central database storing the information as received from the plurality of independent processing units.

23. The system of claim 22 wherein the communication link is established via the Internet.

24. A system for electronic aggregation and exchange of information compiled by entities preparing or handling tax information, the system comprising:

a plurality of independent tax return preparation processing units preparing or handling tax information;

a central processing unit having a communication link to the plurality of independent processing units, means for protecting information indicating identities of persons or entities connected with the information;

a central non-tax compliance authority database storing the information wherein fulfillment of requests not related to tax preparation functions is enabled by said non-tax compliance authority database; and a request processing unit having a communication link to the plurality of independent processing units processing a request for information for non-compliance purposes and sending requested information to the plurality of independent processing units.

25. The system of claim 24 further comprising an automatic processing unit for collecting a fee for processing a request for information.

26. The system of claim 25 wherein the communication link is established via the Internet.

27. A method for electronic aggregation of information compiled by entities preparing tax information, the method comprising:

electronically downloading information affecting preparation of tax information compiled by a plurality of submitting entities for preparation of the tax information;

removing identifying information from the information affecting the preparation of tax information; and storing the information affecting the preparation of tax information with identifying information removed in a non-tax compliance authority database wherein fulfillment of requests not related to tax preparation functions is enabled by said non-tax compliance authority database.

28. The method of claim 27 further comprising the step of storing separately the information affecting the preparation of the tax information in a plurality of submitting entity formats and allowing a submitting entity to access the information downloaded from the submitting entity in original format.

29. A method for electronic aggregation of information compiled by entities preparing tax information, the method comprising:
   electronically downloading information affecting preparation of tax information compiled by a plurality of submitting entities for preparation of the tax information;
   archiving the information affecting the preparation of the tax information in original format submitted by submitting entity in a non-tax compliance authority database wherein fulfillment of requests not related to tax preparation functions is enabled by said non-tax compliance authority database;
   allowing a submitting entity to access the information downloaded from the submitting entity in original format;
   storing separately in a second non-tax compliance authority database the information affecting the preparation of the tax information in a uniform format;
   protecting identifying information from within the information affecting the preparation of tax information; and
   storing the information affecting the preparation of tax information with identifying information protected in a third database.

30. The method of claim 29 further comprising:
   receiving a request from a requesting party for use of the information affecting preparation of tax information;
   retrieving data from the information affecting preparation of tax information to fill the request; and
   sending the requested data to the requesting party.

31. A system for electronic aggregation of information compiled by entities preparing or handling tax information, the system comprising:
   a plurality of independent processing units gathering information affecting preparation of tax information;
   at least one communication link in communication with the plurality of independent processing units;
   a central non-tax compliance authority database in communication with the communication link storing the information affecting preparation of tax information in original format communicated across the communication link;
   a processing unit removing identifying information from the information affecting the preparation of tax information;
   a second central database storing the information affecting preparation of tax information with identifying information removed; and
   at least one communication link for communicating information from the central database and the second central database to a requesting party.

32. A system for electronic aggregation of information compiled by entities preparing or handling tax information, the system comprising:
   a plurality of independent processing units preparing or handling tax information;
   a central processing unit having a communication link to the plurality of independent processing units, the central processing unit protecting information indicating identities of entities submitting the information to the plurality of independent processing units;
   a central non-tax compliance authority database storing the tax information with protected information indicating identities wherein fulfillment of requests not related to tax preparation functions is enabled by said non-tax compliance authority database; and
   a request processing unit having a communication link to the plurality of independent processing units processing a request for information and sending requested information to the plurality of independent processing units.

33. A system for electronic aggregation and exchange of information compiled by entities preparing or handling tax information, the system comprising:
   a plurality of independent processing units preparing or handling tax information;
   a processing unit having a communication link to the plurality of independent processing units, the central processing unit removing information indicating identities of persons or entities connected with the information to the plurality of independent processing units;
   a non-tax compliance authority database storing the information wherein fulfillment of requests not related to tax preparation functions is enabled by said non-tax compliance authority database; and
   a request processing unit having a communication link to the plurality of independent processing units processing a request for information and sending requested information to the plurality of independent processing units.

34. The system of claim 33 further comprising an automatic processing unit for collecting a fee for processing a request for information.

35. The system of claim 34 wherein the communication link is established via the Internet.

36. A system for electronic aggregation of information compiled by entities preparing or handling tax information, the system comprising:
   a plurality of independent processing units gathering information affecting preparation of tax information;
   at least one communication link in communication with the plurality of independent processing units;
   a first non-tax compliance authority database in communication with the communication link storing the information affecting preparation of tax information in original format communicated across the communication link;
   a processing unit protecting identifying information from the information affecting the preparation of tax information;
   a second non-tax compliance authority database storing the information affecting preparation of tax information with identifying information protected wherein fulfillment of requests not related to tax preparation functions is enabled by said non-tax compliance authority database; and
   at least one communication link for communicating information from the first database and the second database to a requesting party.

37. A system for electronic aggregation of information compiled by entities preparing or handling tax information, the system comprising:

a plurality of independent processing units preparing or handling tax information;

a processing unit having a communication link to the plurality of independent processing units, the processing unit protecting information indicating identities of persons or entities connected with the information to the plurality of independent processing units;

a non-tax compliance authority database storing the tax information with protected information indicating identities wherein fulfillment of requests not related to tax preparation functions is enabled by said non-tax compliance authority database; and a request processing unit having a communication link to the plurality of independent processing units processing a request for information and sending requested information to the plurality of independent processing units.

* * * * *